United States Patent
Jäck et al.

(10) Patent No.: US 6,619,466 B1
(45) Date of Patent: Sep. 16, 2003

(54) PROCESSING STATION ON A MOTOR VEHICLE ASSEMBLY LINE

(75) Inventors: Kurt Jäck, Aulendorf (DE); Helmut Leuter, Wolfegg (DE); Berthold Riegger, Vogt (DE); Anton Brauchle, Bergatreute (DE)

(73) Assignee: Thyssenkrupp Technologies AG (DE)

( * ) Notice: Subject to any disclaimer, the term of this patent is extended or adjusted under 35 U.S.C. 154(b) by 0 days.

(21) Appl. No.: 09/959,196
(22) PCT Filed: May 23, 2000
(86) PCT No.: PCT/EP00/04688
 § 371 (c)(1),
 (2), (4) Date: Feb. 12, 2002
(87) PCT Pub. No.: WO01/00479
 PCT Pub. Date: Jan. 4, 2001

(30) Foreign Application Priority Data

Jun. 26, 1999 (DE) .......................................... 199 29 443

(51) Int. Cl.⁷ .............................................. B65G 47/24
(52) U.S. Cl. .................. 198/373; 198/346.1; 198/465.1
(58) Field of Search .......................... 198/465.1, 346.1, 198/373, 412, 403; 414/774, 779, 785

(56) References Cited

U.S. PATENT DOCUMENTS

| 1,519,357 A | 12/1924 | Campbell |
| 2,610,747 A | 9/1952 | Hall |
| 4,295,427 A | 10/1981 | Waterman et al. |
| 4,599,034 A | 7/1986 | Kennedy et al. |

FOREIGN PATENT DOCUMENTS

| DE | 44 04 422 A1 | 9/1994 |
| DE | 44 36 901 A1 | 4/1995 |
| DE | 44 37 901 A1 | 5/1995 |
| EP | 0 492 673 A1 | 7/1992 |
| EP | 0 526 863 A1 | 2/1993 |
| WO | WO 89/00938 | 2/1989 |

Primary Examiner—Joseph E. Valenza
(74) Attorney, Agent, or Firm—McGlew and Tuttle, P.C.

(57) ABSTRACT

A processing station in motor vehicle assembly lines has two receiving frames (20), for a motor vehicle part (33), which are mounted on associated columns (2, 3) at mutually spaced locations in a synchronously height-adjustable manner and are synchronously revolvable about mutually aligned horizontal axes of rotation. Each receiving frame (20) is mounted on two said columns (2, 3) arranged on both sides of the axis of rotation and that the mutual distance between the columns (2, 3) is greater than the width of the motor vehicle part (33) or of a transport element (29) for the motor vehicle part (33).

13 Claims, 5 Drawing Sheets

US 6,619,466 B1

PROCESSING STATION ON A MOTOR VEHICLE ASSEMBLY LINE

FIELD OF THE INVENTION

The present invention pertains to a processing station on motor vehicle assembly lines, with a mounting means for a motor vehicle part or for a transport means intended therefor, which is rotatable around a horizontal axis of rotation, with conveyors, which end in front of and behind the processing station, and with another conveyor, which is arranged between the conveyors and can be raised and lowered.

BACKGROUND OF THE INVENTION

Such processing stations, which are also called lifting and rotation units, can be placed in various areas of a production line in order to assemble or process motor vehicle parts, especially body parts. This may be carried out manually or in automated operation. The drives for the height adjustment and for the rotation or pivoting of the mounting frames are equipped for this purpose with control and positioning means in order for the motor vehicle part braced on the mounting frame to be able to be brought into a desired position for the processing. The conveyors ending in front of and behind the processing station are arranged for loading in the longitudinal direction, i.e., in the direction of the axis of rotation of the mounting means.

In a prior-art processing station of the type described in the introduction (DE 4437901 A1, embodiment corresponding to FIG. 14), the mounting means has a single mounting frame, which comprises two mounting arms and which is fastened either cantilevered at one end of the processing station on a rim bearing or at both ends on a rim bearing each. The motor vehicle part located on a transport means is transported in this embodiment by the conveyors ending in front of the processing station onto the additional raised conveyor located within the processing station. The additional conveyor is then lowered until the motor vehicle part lies on the mounting frame outside the transport means. The motor vehicle part subsequently must be locked with the mounting frame and separated from the transport means so that the additional conveyor with the transport means locked thereon can be lowered further. The separation of the motor vehicle part from the transport means prior to the processing and the subsequent relocking represent additional operations. Moreover, there is no flexibility in terms of the level at which the processing is carried out because of the fixed arrangement of the horizontal axis of rotation of the mounting frame. The mounting arms of the mounting frame, which extend in the longitudinal direction, additionally compromise the free accessibility from the side. Finally, the manufacturing effort and the cost of acquisition for the rim bearing or the rim bearings are very substantial.

In another processing station (EP 0432673 A1), each mounting frame is held on one column only, which is located centrally in front of the mounting frame and therefore hinders or prevents the loading of the processing station with a motor vehicle part or a transport means (transport skid) for the motor vehicle part. Therefore, the motor vehicle part can be introduced between the columns and placed on the mounting frame and braced therewith from the side only.

In another embodiment (DE 44 04 422), a continuous rotor with a plurality of mounts arranged on the circumference on the rotor for the motor vehicle part or for a transport skid extends between the columns arranged centrally. Even though the motor vehicle parts or the transport skid can thus be brought to the mounts in the direction of the axis of rotation of the rotor and braced therewith, the rotor with the mounts is not adjustable in height and, in addition, the design of the rotor hinders the manual or automatic processing of the motor vehicle part.

Finally, a repair workshop for railroad cars, especially railroad freight cars, with a processing station has been known from U.S. Pat. No. 4,295,427. A track, on which the railroad cars move into the processing station and leave same, with new or repaired bogies, extends through the entire workshop. The processing station has at one end a longitudinally displaceable portal with a crosshead which is synchronously adjustable in height and with a mounting arm, which is arranged rotatably thereon and which is provided with a coupling element and two tension chains, with which the car body can be grasped and lifted off from the bogies, rotated around its longitudinal axis and deposited again, optionally on other bogies. The workshop is neither suitable nor intended for the transport of a motor vehicle part located on a transport means, especially a transport skid, into the processing station.

SUMMARY AND OBJECTS OF THE INVENTION

The object of the present invention is to provide a processing station, which is freely accessible and loadable from all sides.

This object is accomplished by the mounting means or mechanism comprising two mounting frames arranged at mutually spaced locations from one another, which are arranged on a crosshead each and are synchronously rotatable around the horizontal axis of rotation. Each crosshead is mounted and guided on two columns arranged on both sides of the axis of rotation and both crossheads are synchronously adjustable in height. The conveyors end in front of the crossheads above the lowered crossheads and the lowered mounting frames. The mutual distance between these columns is greater than the width of the motor vehicle part or of a transport means for the motor vehicle part. On the whole, the processing station consequently has four columns, which are arranged in the area of a rectangle formed by them, so that motor vehicle parts or transport skids intended for them can be introduced into the processing station from all sides. Since the motor vehicle parts or the transport skids are braced with the mounting frames at their respective ends only, all areas of the motor vehicle part located in the processing station are freely accessible for manual as well as automatic processing in case of a corresponding height adjustment and rotation of the mounting frames.

One of the columns of each crosshead for the mounting frames is preferably designed as a drive column and the other column as a guide column. Each mounting frame is preferably arranged rotatably on a crosshead, which is mounted and guided on the two columns.

For loading in the longitudinal direction, i.e., in the direction of the axes of rotation of the mounting frames, conveyor belts may be arranged, which end in front of the crossheads. In addition, an additional conveyor is arranged, which is arranged between the two crossheads and can be raised and lowered. The conveyors preferably end in front of the crossheads above the lowered crossheads or the lowered mounting frames. The conveyor, which can be raised and lowered, needs to extend only between the ends of the mounting frames. In another embodiment, the conveyor, which can be raised and lowered, may extend into the area of the mounting frames and have end-side openings for the passage of the mounting frames during a relative movement between the mounting frame and the conveyor. All conveyors are preferably designed as roller conveyors.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
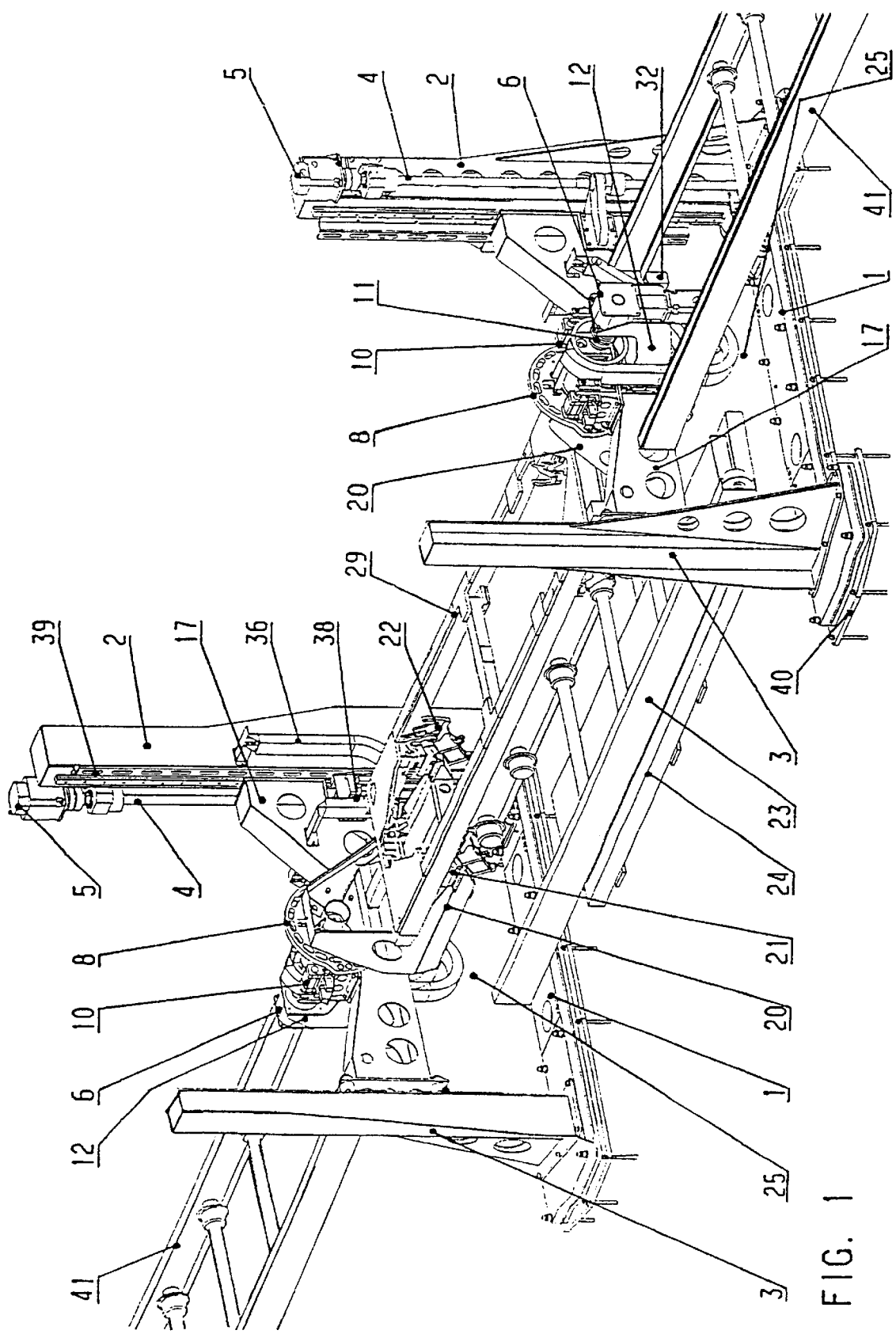
FIG. 1 is a schematic perspective view of a processing station in motor vehicle production lines.
Figure 2:
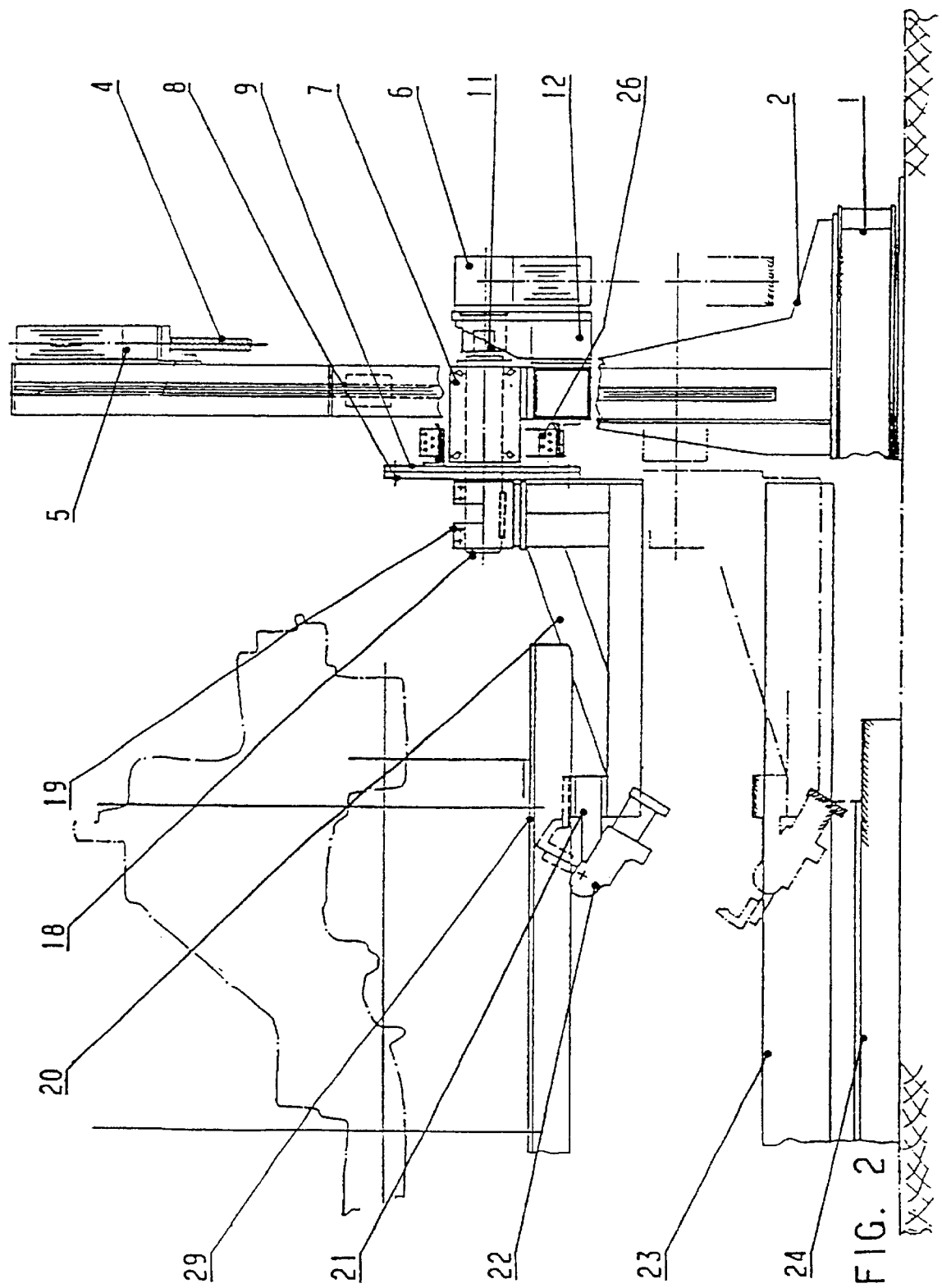
FIG. 2 is a partial side view of the object according to FIG. 1.

Referring to the drawings in particular, two base plates 1, which can be directed independently from one another, are arranged at mutually spaced locations from one another on a foundation, not shown. A drive column 2 and a guide column 3 are mounted on each base plate. A threaded spindle 4 with a drive motor 5 is mounted in the drive column 2, the threaded spindle being used for the height adjustment of a crosshead 17, which extends between the two columns 2, 3 and is only guided in the guide column 3. The distance between the two columns 2, 3 and consequently also the width of the crosshead 17 are greater than the width of a motor vehicle part 33 indicated by dash-dotted fines in FIGS. 3, 4 and 5.

A perforated strip 39, which is arranged along the guide column 2 or 3 and with which a pneumatic cut-off device 38 arranged on the crosshead 17 is associated, is used for the manual and mechanical safety during the exact height positioning of the crosshead 17. The drive motor 5 for the height adjustment receives its energy via an energy chain 36.

Each crosshead 17 carries a bearing block 7 for a shaft 18 mounted therein. The shafts 18 are flush with one another if the crosshead 17 is aligned at the same level. A mounting frame 20, which has a support 21 for a motor vehicle part 33 that can be braced thereon by means of a tensioning unit 22 or for a transport skid, is fastened to each shaft 18 at its end facing the other crosshead 17 by means of a clamping unit 19.

A drive motor 6, which can put the shaft 18 into rotation by means of a coupling 11, is held on a motor carrier 12 on the other side of the crosshead 17. The drive motor 6 receives its energy via an energy chain 26.

A positioning disk 8 with a cut-off disk 9 and an associated pneumatic cut-off device 10 is used for the exact rotational positioning of the mounting frame 20.

Roller conveyors 41 extends on both sides of the processing station, the roller conveyors ending in front of the crossheads 17, doing so above the crossheads 17 with the assembly units located thereon when the crossheads 17 have been lowered to the extent that they are supported with a fixed stop 32 on an associated abutment.

A roller conveyor 23 is located between the two crossheads, the roller conveyor being able to be raised and lowered by means of a lifter 24 and having end-side openings 25 in the embodiment being shown, which openings are so large that the mounting frames 20 can pass through during the relative movement between the mounting frames 20 and the roller conveyor.

Figure 3:
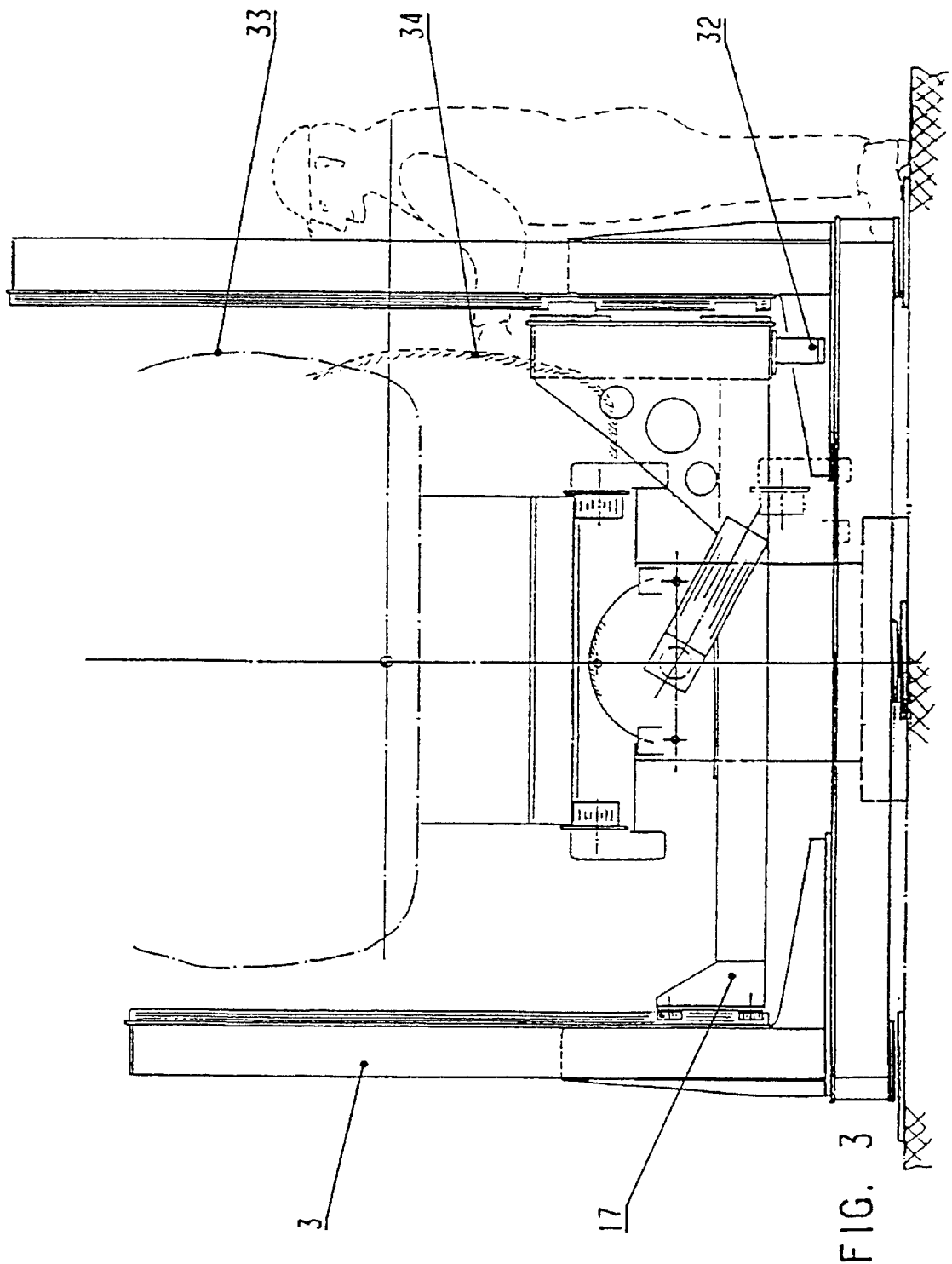
FIG. 3 is a front view of the object according to FIG. 1.
Figure 4:
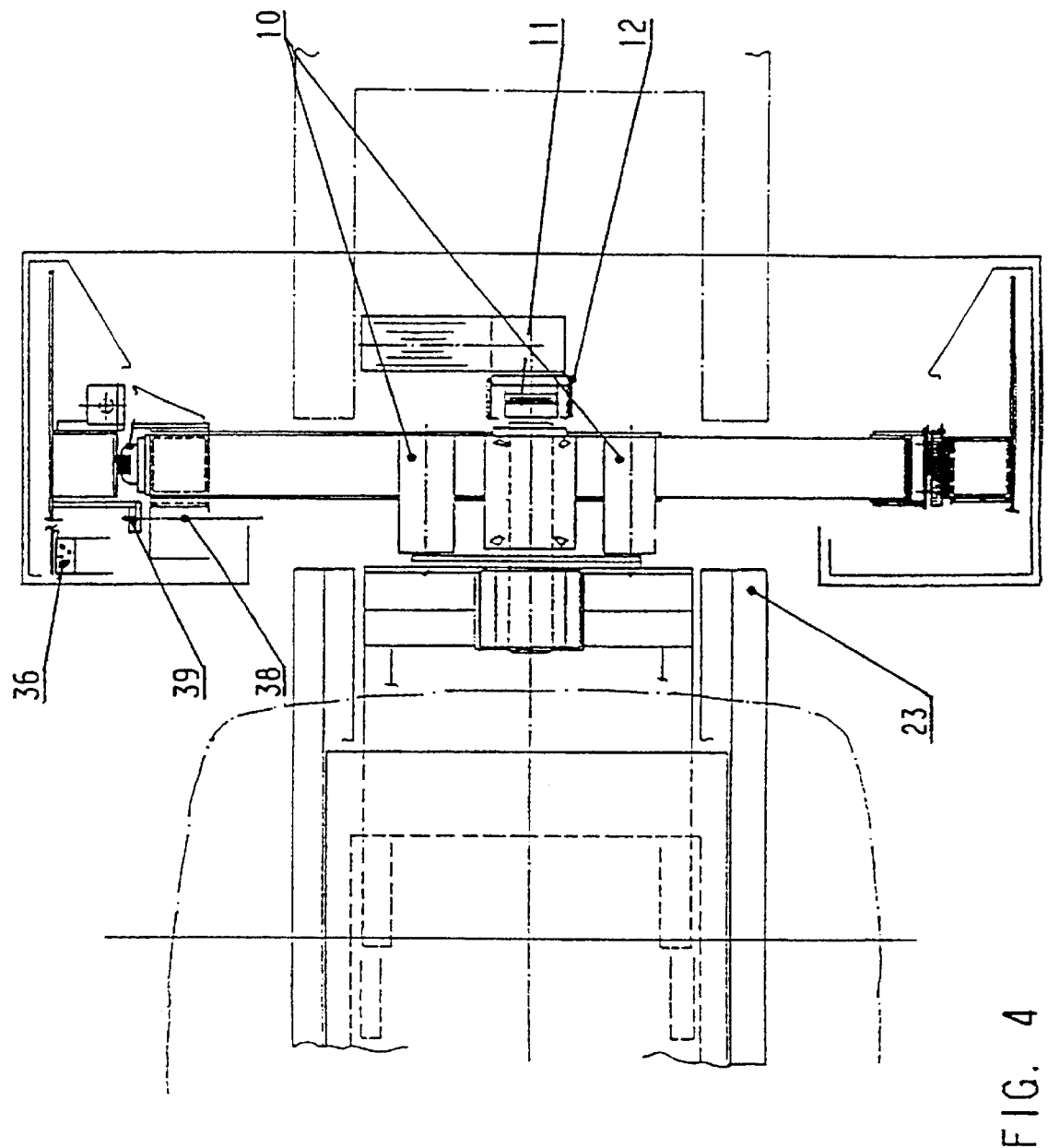
FIG. 4 is a top view of the subject according to FIG. 2 and FIG. 3.
Figure 5:
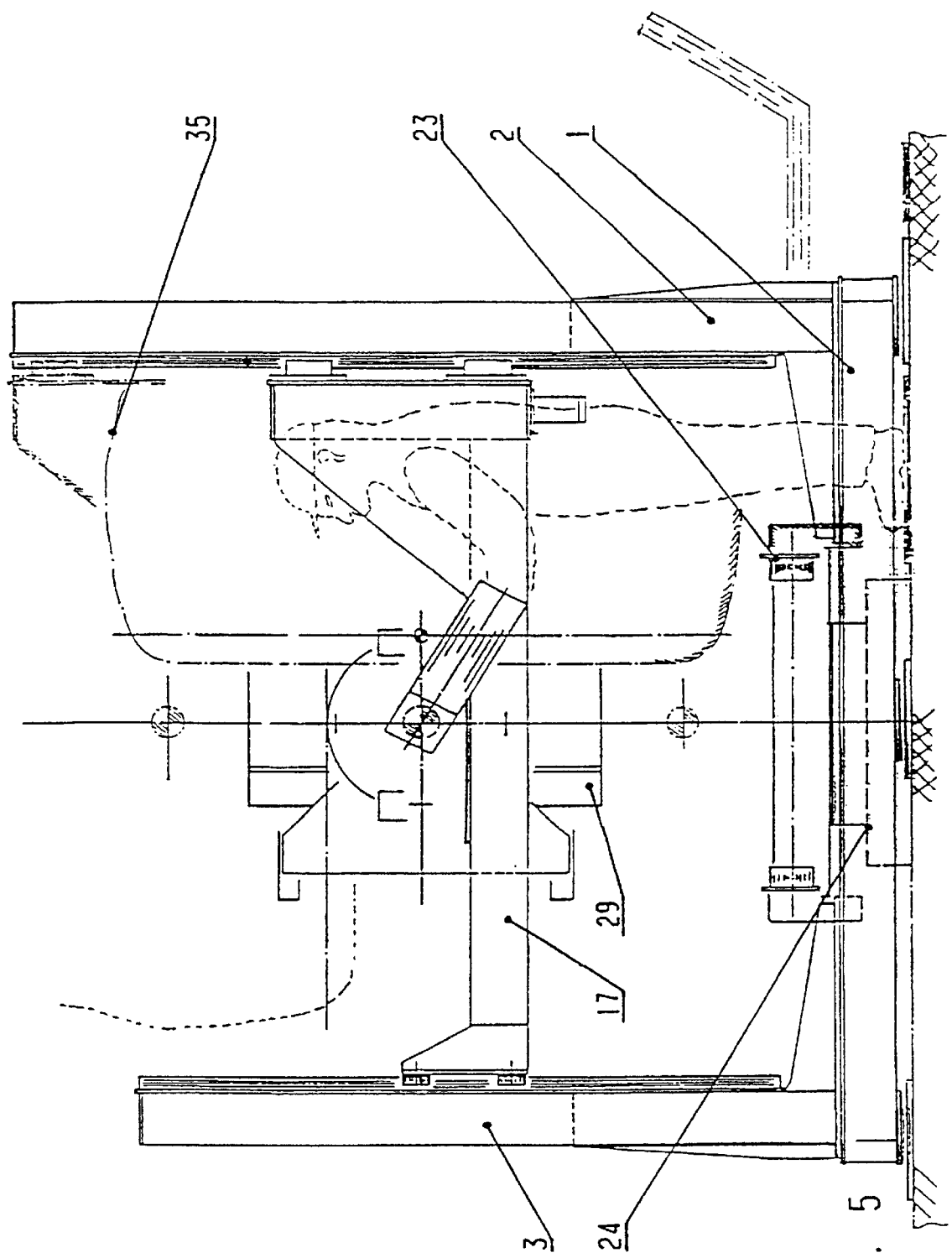
FIG. 5 is a view of the object according to FIG. 3 in another functional position.

To load the processing station, the crossheads 17 are lowered until their fixed stop 32 comes into contact with the associated abutment. The roller conveyor 23 located between the crossheads 17 is raised into the plane of the outer roller conveyors 41. A transport skid 29 with the motor vehicle part located thereon can then be moved by the roller conveyor 29 onto the roller conveyor 23. The roller conveyor 23 is then lowered and the crossheads 17 are raised until the transport skid 29 lies on the mounting frames 20. After bracing the transport skid 29 with the mounting frames 20, the transport skid with the motor vehicle part 33 located thereon can be brought into a position favorable for processing by raising or lowering the crossheads 17 as well as by rotating the mounting frames 20 around the axis of the shafts 18. Examples of this are shown in FIGS. 3 and 5. It can be recognized in FIG. 3 that the motor vehicle part 33 may be arranged at different levels, e.g., in the positions 33 and 34. FIG. 5 shows that the component can also be pivoted into position 35.

It is not shown that the processing station can also be loaded from the side, i.e., at right angles to the axis of rotation defined by the shafts 18.

While specific embodiments of the invention have been shown and described in detail to illustrate the application of the principles of the invention, it will be understood that the invention may be embodied otherwise without departing from such principles.

What is claimed is:

1. A processing station in motor vehicle assembly lines, the station comprising:

a set of first and second columns;

another set of first and second columns;

a motor vehicle mounting or transport part rotatable around a horizontal axis of rotation, said mounting or transport part comprising two mounting frames arranged at mutually spaced locations from one another;

a front conveyor ending in front of the processing station;

a rear conveyor ending behind the processing station;

an additional conveyor arranged between said front conveyor and said rear conveyor, said additional conveyor being raisable and lowerable;

a first and second crosshead synchronously rotatable around the horizontal axis of rotation each said crosshead being mounted and guided on said first and second columns of respectively of said set of columns and said another set of columns arranged on sides of the axis of rotation, said crossheads being synchronously adjustable in height, said front conveyor ending adjacent to one of said crossheads above the lowered adjacent crosshead and the lowered mounting frames, said rear conveyor ending adjacent to the other of said crossheads above the lowered adjacent crosshead and the lowered mounting frames and a mutual distance between the first and second columns is greater than a width of said motor vehicle part or a width of said motor vehicle mounting or transport part.

2. A processing station in accordance with claim 1, wherein one column of a set of columns associated with each crosshead is a drive column and the other column of a set of columns associated with each crosshead is a guide column.

3. A processing station in accordance with claim 1, wherein said additional conveyor extends only between the ends of said mounting frames.

4. A processing station in accordance with claim 1, wherein said additional conveyor extends into an area of said mounting frames and has end-side openings for the passage of said mounting frames during a relative movement between said mounting frame and said conveyor.

5. A processing station in accordance with claim 1, wherein said rear conveyor is a roller conveyor and said front conveyor is a roller conveyor.

6. A processing station in accordance with claim 2, wherein said additional conveyor extends only between the ends of said mounting frames.

7. A processing station in accordance with claim 2, wherein said additional conveyor extends into an area of said mounting frames and has end-side openings for the passage of said mounting frames during a relative movement between said mounting frame and said conveyor.

8. A processing station in accordance with claim 2, wherein said rear conveyor is a roller conveyor and said front conveyor is a roller conveyor.

9. A motor vehicle processing station comprising:

a first set of first and second columns;

a second set of first and second columns;

a first crosshead mounted and guided on said first set of first and second columns and rotatable around a horizontal axis of rotation;

a second crosshead mounted and guided on said second set of first and second columns and rotatable around the horizontal axis of rotation, said first crosshead and said second crosshead being rotatable synchronously, said crossheads being synchronously adjustable in height;

a front conveyor ending in front of the processing station, said front conveyor ending adjacent to said first crossheads above the lowered adjacent crosshead and the lowered mounting frames;

a rear conveyor ending behind the processing station, said rear conveyor ending adjacent to said second crossheads above the lowered adjacent crosshead and the lowered mounting frames;

an additional conveyor arranged between said front conveyor and said rear conveyor, said additional conveyor being raisable and lowerable; and a motor vehicle mounting part connected to said first and second crossframes and rotatable around a horizontal axis of rotation, said mounting part comprising two mounting frames arranged at mutually spaced locations from one another, a mutual distance between each first and second column of said sets of columns being greater than a width of said motor vehicle part or a width of said mounting part.

10. A processing station in accordance with claim 9, wherein one column of a set of columns associated with each crosshead is a drive column and the other column of a set of columns associated with each crosshead is a guide column.

11. A processing station in accordance with claim 9, wherein said additional conveyor extends only between the ends of said mounting frames.

12. A processing station in accordance with claim 9, wherein said additional conveyor extends into an area of said mounting frames and has end-side openings for the passage of said mounting frames during a relative movement between said mounting frame and said conveyor.

13. A processing station in accordance with claim 9, wherein said rear conveyor is a roller conveyor and said front conveyor is a roller conveyor.

* * * * *